Nov. 27, 1962  E. J. HEFFERON ET AL  3,065,495
CASTER AND SOCKET THEREFOR
Filed Nov. 6, 1959
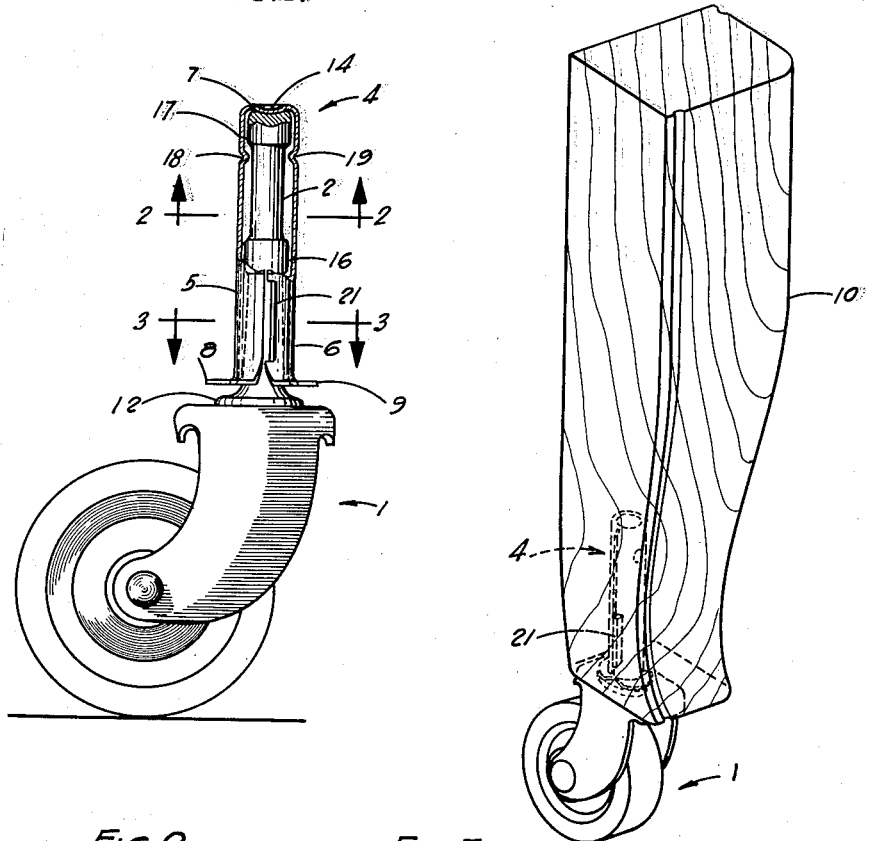
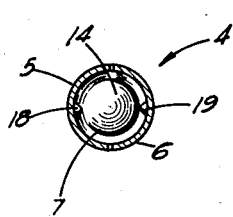
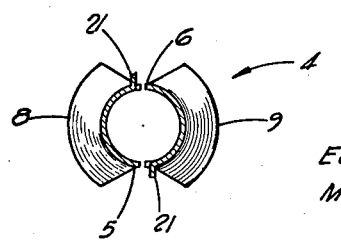
INVENTORS
Edward J. Hefferon
Michael Kramcsak, Jr.
BY Boardman S. Moury
Attorney

United States Patent Office 3,065,495
Patented Nov. 27, 1962

3,065,495
CASTER AND SOCKET THEREFOR
Edward J. Hefferon, Stratford, and Michael Kramcsak, Jr., Bridgeport, Conn., assignors to The Bassick Company, Bridgeport, Conn., a corporation of Connecticut
Filed Nov. 6, 1959, Ser. No. 851,307
2 Claims. (Cl. 16—43)

This invention pertains to casters and their receiving sockets.

It is a principal object of the invention to provide a socket for use within a wooden leg or bottom portion of an article of furniture which will not loosen or fall out during prolonged or rough use.

Another object is to provide a caster socket which does not require a receiving hole of close tolerance.

Another object is to provide a socket of the above type which is of very simple and inexpensive one-piece construction.

Another object is to provide a caster and socket combination having a simple, inexpensive bearing arrangement at the upper end of the caster stem affording low friction contact, self-centering of the stem, and resistance to shock.

Other objects and features will become apparent from the following description read with the accompanying drawing, in which:

FIGURE 1 is an elevational view of a caster and socket combination shown partly in section and illustrating a preferred form of the invention;

FIGURE 2 is a cross-sectional view taken on line 2—2 of FIGURE 1 and in the direction of the arrows;

FIGURE 3 is a cross-sectional view taken on line 3—3 of FIGURE 1 and in the direction of the arrows; and FIGURE 4 is a perspective view of a furniture leg to which the combination of FIGURE 1 has been applied.

Referring in detail to the drawing, caster 1 has a vertically extending stem 2 which is housed within socket 4. The socket comprises a pair of longitudinally extending semi-cylindrical side wall portions 5 and 6 forming a substantially cylindrical body. The wall portions are joined at the upper end by a solid top 7 of the socket. Flanges 8 and 9 extend outwardly from the bottom of the wall portions.

The caster socket is received within the furniture leg 10 so as to abut against the bottom. As is shown in FIGURE 1, the top of the caster stem engages the upper end portion of the socket member for bearing contact and the enlarged portion 12 at the bottom of the stem is vertically spaced below the flanges 8 and 9 a substantial distance. The latter spaced relation provides for sole furniture-supporting bearing engagement between the caster and socket at the upper end of both members.

In order to provide an improved bearing construction, the top of the socket is centrally downwardly dished at 14 for mating engagement with a similarly formed dished top surface of the stem. This formation between the socket and stem provides for self-centering of the stem within the socket and also a bearing surface of very little friction. It is also important to point out that because of the downward formation of the top of the socket resiliency is provided for absorbing a certain amount of shock occasioned by the use of the furniture. In other words, instead of the stem abutting against a flat or upwardly domed top in a dead solid manner, the present downwardly curved formation allows a certain deflection.

It should also be noted that the stem is provided with an enlarged medial portion 16, in addition to the enlarged head portion 17, for lateral bearing contact or positioning of the stem within the socket between the wall portions 5 and 6. The latter wall portions are also provided with simple indentations 18 and 19 over which the enlarged head portion 17 of the stem must be forced during assembly and disassembly of the caster and socket combination. It is obvious that the simple and exceptionally inexpensive expedient of the oppositely disposed indentations retains the caster within the socket upon lifting of the furniture from the floor.

Moving to a most significant contribution of the present invention, each of the wall portions 5 and 6 is provided with an outwardly bent or struck longitudinally extending fin or rib 21. Each rib 21 extends outwardly from the wall halves a relatively short distance and is of uniform width. The purpose of these portions is to engage the opposite sides of the hole in which the caster socket is inserted, depressing and spreading the wood for passage of the portions during the insertion. These ribs, by being embedded in the sides of the hole, positively prevent rotation of the socket within the hole in the furniture leg or other bottom portion of an article of furniture.

Also because of these outwardly projecting ribs, the hole in the furniture need not be of close tolerance, as in the case of the previous sockets in the art. This is because a close fit between the walls of the socket and inside surface of the hole is not necessary for an immovable or fixed position of the socket; but rather the anchoring of the socket within the hole is by means of the ribs embedding themselves into the surrounding wood of the hole.

It is also pointed out as a very important feature of this invention that the bottom of each of the ribs 21 is spaced substantially above the flanges 8 and 9. This spacing allows a certain expansion of the wood inwardly towards the center of the hole after the passage of the ribs through the wood. This expansion of the wood fibers, as well as the pressure of the wood against the longitudinal edges of these ribs in the mounted relation of the socket, locks the socket member within the furniture leg in a very positive manner.

Although the stem and socket have been shown in the drawing as extending vertically, it should of course be realized that in some forms they may be placed within inclined legs of furniture. Any reference to the vertical direction in this application is, therefore, merely relative to the position shown in the drawing and is not to be taken restrictively.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. A non-loosening caster socket for use within an article of furniture having a socket receiving aperture, said socket having arcuate, longitudinally extending side walls interconnected at their top ends by a top portion and having their bottom ends separated and movable toward and away from each other with said top portion being the sole solid connection therebetween, said side walls defining a transverse body portion of comparable exterior dimensions to the socket receiving aperture and insertable therein, a flange projecting outwardly from the bottom end of one of said side walls abuttable with the article of furniture for positioning the socket longitudinally within the socket receiving aperture, at least one of said side walls including a single, generally longitudinal rib projecting outwardly from one side edge thereof with the opposite side edge being free of projections, said rib being adapted to be embedded in the article of furniture adjacent the periphery of the socket receiving aperture for preventing turning of said socket relative to said socket receiving aperture with the opposite side edge of said side wall allowing the remainder of said side will to shift within said aperture to conform to the periphery thereof in the event the aperture is not perfectly round.

2. A non-loosening caster socket for use within an article of furniture having a socket receiving aperture comprising: a pair of substantially semi-cylindrical side wall portions arranged so as to form a substantially cylindrical body insertable within the receiving aperture, a solid top wall joining the side wall portions at the upper ends thereof and being the sole solid connection therebetween, an outwardly directed flange at the bottom of each side wall portion engageable with the article of furniture to longitudinally position the socket thereon, each of said side walls having a single, generally longitudinal rib projecting outwardly from one side edge thereof with the opposite side edge being free of projections, said ribs being insertable into the article of furniture adjacent the periphery of said receiving aperture whereby said ribs prevent turning of said socket relative to said socket receiving aperture with the opposite side edges of said side walls allowing the remainder of said side walls to shift within said aperture to conform to the periphery thereof in the event the aperture is not perfectly round.

References Cited in the file of this patent
UNITED STATES PATENTS

| | | |
|---|---|---|
| 436,308 | Diss | Sept. 9, 1890 |
| 543,870 | Hoffman | Aug. 6, 1895 |
| 664,875 | Livingstone | Jan. 1, 1901 |
| 716,341 | Livingstone | Dec. 16, 1902 |
| 1,426,494 | Noelting | Aug. 22, 1922 |
| 1,466,531 | Johnson | Aug. 28, 1923 |